United States Patent

Köhn et al.

[11] Patent Number: 5,092,994
[45] Date of Patent: Mar. 3, 1992

[54] MEMBRANE FILTER SYSTEM

[75] Inventors: Heinz-Gerhard Köhn, Dransfeld; Eckart Kopowski; Helmut Köcher, both of Braunschweig, all of Fed. Rep. of Germany

[73] Assignee: Heraeus Sepatech GmbH, Osterode am Harz, Fed. Rep. of Germany

[21] Appl. No.: 694,570

[22] Filed: May 2, 1991

[30] Foreign Application Priority Data

May 4, 1990 [DE] Fed. Rep. of Germany ....... 4014282

[51] Int. Cl.⁵ ............................................. B01D 61/20
[52] U.S. Cl. ................................. 210/227; 210/321.6; 210/321.72
[58] Field of Search ........ 210/224, 226, 227, 228–231, 210/321.6, 321.72, 321.75, 321.84, 541, 542

[56] References Cited

U.S. PATENT DOCUMENTS 3,306,459  2/1967  Bush .
3,401,799  9/1968  Weyand et al. .
3,560,377  2/1971  Loeffler .
4,159,954  7/1979  Gangemi .

FOREIGN PATENT DOCUMENTS 2557521 10/1977 Fed. Rep. of Germany .
3327431  2/1985 Fed. Rep. of Germany .
3507908  9/1986 Fed. Rep. of Germany .
3831771  3/1990 Fed. Rep. of Germany .
 130449  4/1978 German Democratic Rep. .
1320639  6/1973 United Kingdom .

Primary Examiner—Frank Sever
Attorney, Agent, or Firm—Frishauf, Holtz, Goodman & Woodward

[57] ABSTRACT

To eliminate welds when forming connections from coupling joints of membrane filter structures having two external housing plates between which a membrane filter assembly (3, 4) is positioned, one (2) of the housing plates (1, 2) is formed with a bored or milled, essentially circular recess at each one of the locations where fluid connection couplings (6–9) are to be placed, the fluid connection couplings being formed by a plug element which is clamped in sealing engagement against a sealing bottom wall surface (13) of the respective recess. To provide absolute tightness, even of molecular substances such as bacteria, tissue elements, yeasts and the like, a sealing ring, preferably an O ring (15) is placed in a groove (14) formed in the sealing wall surface (13).

10 Claims, 2 Drawing Sheets ns,994

MEMBRANE FILTER SYSTEM

FIELD OF THE INVENTION

The present invention relates to a filter system, and more particularly to a connection arrangement to connect external connection ducts or hoses to a filter, in which the filter and the hose connection must be absolutely tight to prevent possible leakage to the outside environment or from the outside environment to the filter system, which is particularly important in such filter systems handling microbiological substances, including bacteria, viruses and the like.

BACKGROUND

Membrane filter arrangements are well known and are used, for example, to separate solid substances from fluids. These substances may, for example, be bacteria, human and/or cells. The membrane filter arrangement permits, by filtration, to enrich the fluid medium with high molecular substances. A system and an arrangement for such a filter is described in the referenced publication, German Patent Disclosure Document DE-OS 38 31 771, Schmeisser et al, assigned to the assignee of the present application.

Filter structures which can carry out such filtrations, as known, utilize two housing plates between which a filter membrane or a filter package is clamped. A circumferential seal seals the filter membrane and/or filter package or array with respect to the outside. The plates which retain the filter package are clamped together. The plates usually are massive, solid plates of high-quality steel, with a thickness of about 1.5 cm. Bores extend through these housing plates in order to be able to supply a filtrate to the membrane filter as well as a concentrate, and to remove filtrate and concentrate therefrom. The connections between the outside and the filter structure usually is by means of a connecting stub which has a connection flange. The stubs are welded to the outside of the housing plates. The connecting flange has a sealing surface which is in cooperate engagement with the sealing surface of a further coupling element for the outside connection, for example a hose. A sealing element as such, for example an O ring, can be located between the connecting stub and the coupling element. The connection, which is a type of flange connection, is retain in place by clamps which press the sealing surfaces as well as the sealing element against each other.

It has been found in operation that the welds on which the sealing stub is welded to the housing plate are subject to defects. Fissures, hairline cracks and the like may occur, for example upon bending or twisting loading placed against the connecting stubs and/or coupling elements. Welding stubs to the plates is expensive and requires meticulous quality control in order to avoid leaks in their construction. Even hairline fissures which will not result in actual fluid leakage may lead to contamination of the environment by molecular substances or substrate escaping through the hairline fissures or cracks; further, it is equally possible that some such leakage points may contaminate the filtrate and/or the concentrate, for example by ingress of external bacteria, which are in the ambient environment.

Fissures or hairline cracks may occur not only due to mechanical stresses and loading, but also by change of the chemical or crystallographic characteristics of the plate and/or connecting stub in the region of the weld, resulting in increased susceptibility to corrosion in the region of the connection.

THE INVENTION

It is an object to provide a filtration system using a membrane filter, which includes a connection or coupling arrangement for externally connecting filter media or filtrate media to the filter system, which is not subject to corrosive attack, and which can be made inexpensively, while providing a secure connection to the filter, and which is not subject to leakage into or from the filter, even of substances of only molecular size.

Briefly, at least one of the plates, and preferably only one of the plates, has through-bores extending thereacross, to communicate the space taken up by the membrane or membrane array with the outside of the filter structure. In accordance with a feature of the invention, a recess is formed in the surface remote from the membrane and surrounding the through-opening or bore of the respective filter plate. The recess defines a bottom wall sealing surface, surrounding the bore, the bore passing through the bottom wall sealing surface. A connection stub, likewise formed with a sealing surface, is then engaged within the recess, and a clamping arrangement clamps the connection stub or plug against the plate, to effect sealing connection between the plate sealing surface and the plug sealing surface.

In accordance with a feature of the invention, and to ensure a tight seal connection and a good seat of the plug against the plate sealing surface, a sealing element, preferably an O ring seal, is fitted into the sealing surface, for example by being placed in a groove therein. The plug, which is used to couple external connecting ducts, hoses or tubing, preferably has an outer conical or inclined surface, and the clamping arrangement which clamps the plug in sealing engagement against the plate sealing surface can be a U-shaped or horseshoe-shaped bracket which engages against the inclined or conical surface. The U or horseshoe bracket can be secured to the plate, in clamping engagement, by a nut which can be screwed on an extension shaft of the same bolts which hold the plates of the filter structure together or by separate nuts or bolts screwed into suitable blind tapped bores formed in the plate.

The arrangement has the advantage that the filter system, which can be constructed and arranged as a cross-flow membrane filter module, does not require welded connection elements formed on the housing plate. The connections are formed merely by interengaging recesses, tapped into the wall of the plate, for example by a drilling or boring tool, into which the projecting element of the plug fits. The plug then can be connected, as well known, and in accordance with any suitable arrangement to tubing or hoses for conducting the filtrate and the concentrate to the filter, and removing filtrate and enriched concentrate therefrom. The arrangement is particularly simple to make since the bottom wall of the recess simultaneously forms a plate sealing surface. It can readily be machined to be smooth, or even polished; the smooth surface then can form an excellent sealing surface with a matching plug sealing surface, enhanced, even, in sealing effect by including a resilient sealing element therein, such as the aforementioned O ring. External connections, for example of hoses, tubing and the like, will lead out of the plug remote from the clamping element, which is located in the region of each one of the connecting through-bores, the clamping element clamping the plug into sealing engagement in the respective recess. This arrangement has the additional advantage that the sealing surface of the connecting plug is placed within the outer surface of the housing plate. No welding work is required, and any deformations due to welding heat and disturbance of the lattice structure of the plate are avoided. The system has the additional advantage that it is not necessary to disassemble the membrane structure or to loosen the bolts which hold the plates of the membrane system together if the connecting plug is to be released; it is only necessary to loosen the clamp or remove it so that the plug can be severed from the sealing surface.

Preferably, the connecting through-bores are circular, and the sealing surface is a circular milled recess, concentric with the bores.

DRAWINGS

DETAILED DESCRIPTION

Figure 1:
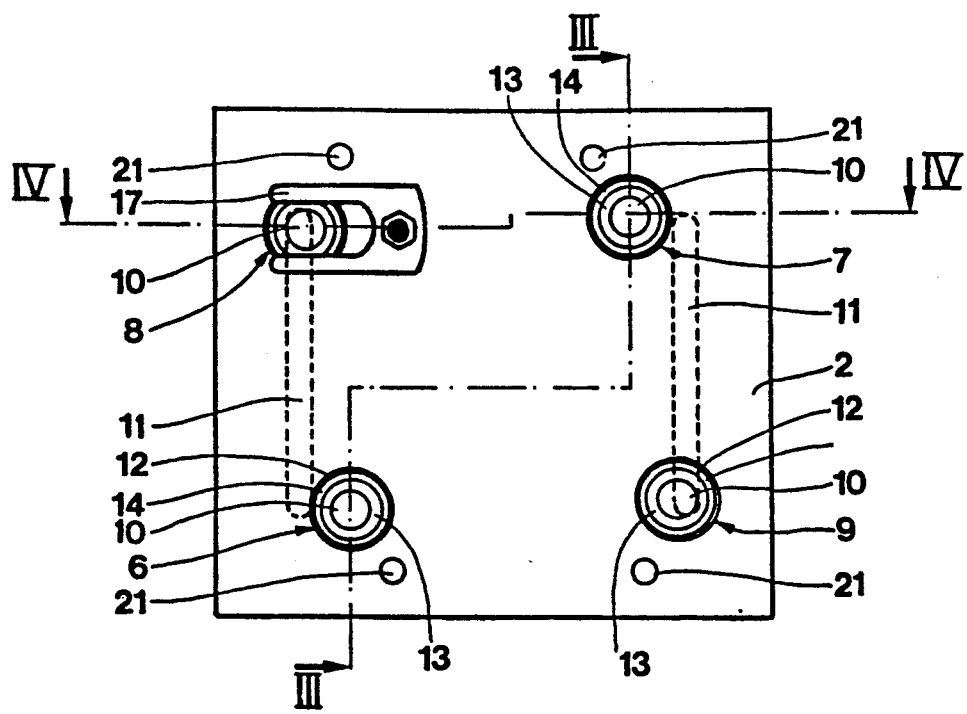
FIG. 1 is a highly schematic top view of a membrane filter system, looking at one of the housing plates.
Figure 2:
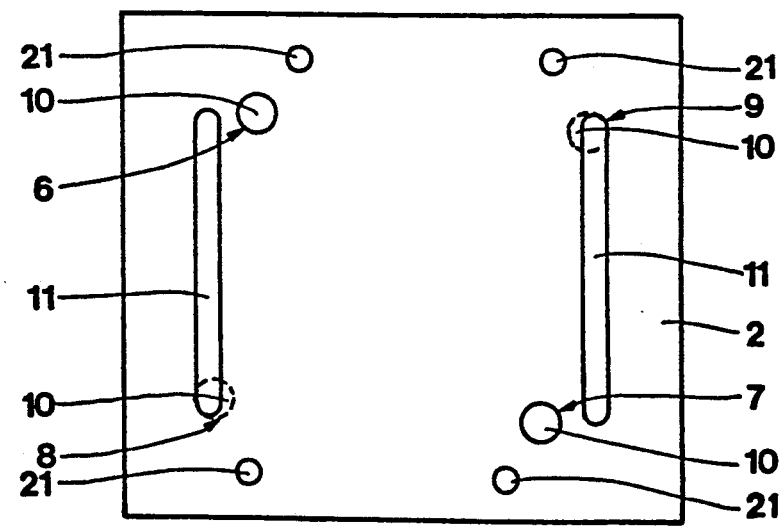
FIG. 2 illustrates the housing plate seen in FIG. 1, from the inside.
Figure 3:
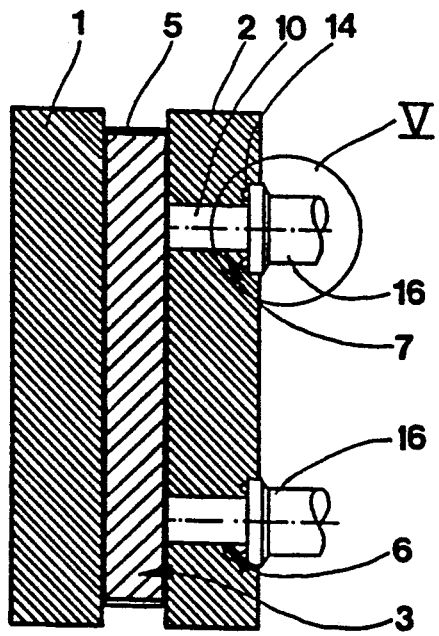
FIG. 3 is a section along the broken section line III—III.
Figure 4:
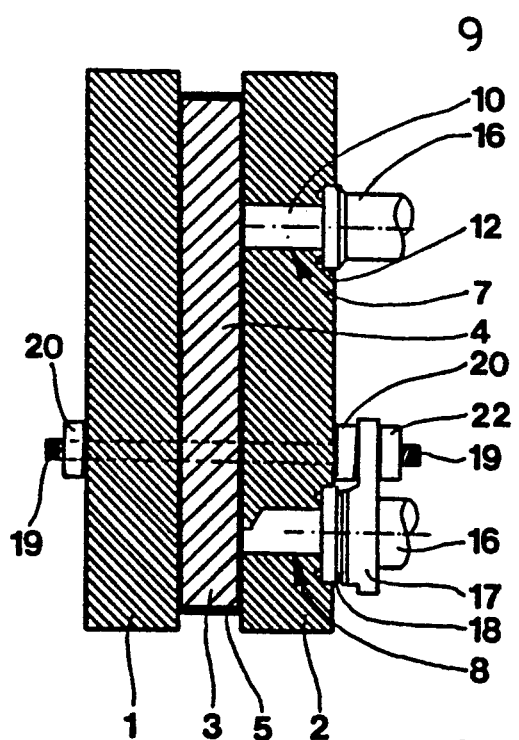
FIG. 4 is a section along the broken section line IV-IV of FIG. 1.

The filter system, see FIG. 1, has two housing plates 1, 2 (FIGS. 3, 4) having square or rectangular cross section. A membrane filter 3 is clamped between the housing plates 1 and 2. The membrane filter 3 is a filter package or filter array or filter cartridge 4 (FIG. 4) which is sealed at its free edge with a silicone seal 5. The silicone seal 5 is in sealing engagement with the inner surfaces of the plates 1, 2. The housing plates are made of high-quality steel, and have a thickness of between 1.5 to 2 cm. As best seen in FIGS. 3 and 4, connections 6, 7, 8 and 9 (FIG. 1) are provided on one of the housing plates, in the present example on housing plate 2. The connections have different spacing from the outer edges of the housing wall 2. The inner connections, as can be seen in FIGS. 1 and 2, form a supply connection 6 and a drain connection 7 for supplying and removing, respectively, a filtrate, such as water. The outer connections, that is, the connections closer to the edge of the plate 2, form a supply connection 8 and a drain or removal connection 9 for supply and removal of a concentrate. The supply connection 6 and the removal connection 7 are through-bores. The connections 7, 8 are also through-bores but terminate for the concentrate. The grooves 11 extend, essentially, along the respective side walls of the filter package, cartridge or array 4.

Figure 5:
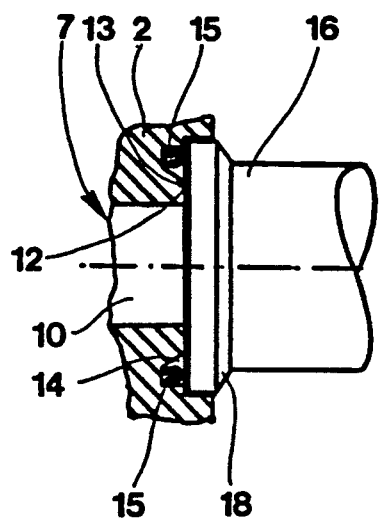
FIG. 5 is an enlarged detailed sectional view of the portion within the circle V of FIG. 3.

In accordance with a feature of the invention, the through-bores shown, generally, at 10 terminate at the side of the plate remote from the filter 3 in a recess 12 which is coaxial with the axis of the bore. The recess 12 is bored or milled into the surface of the housing plate 2 and forms a connection which is recessed within, that is, is within the outline of the housing plate 2, and recessed with respect to the major plane forming the external surface. The bottom wall 13 of the recess 12, as best seen in FIG. 5 in an enlarged representation, is a smooth flat sealing surface which, in the outer end or edge region has ring groove 14 formed therein, for example cut into the material of the plate. A sealing element 15 is placed in the ring groove 14.

A connecting plug 16 which is formed with a plug sealing surface engages the plate sealing surface 13. A clamping element 17, of generally U or horseshoe shape, is clamped, as best seen in FIG. 4, against a conical outer surface 18 of the plug 17. The clamping element 17 can be tightened towards the outer surface of the plate 2 by tightening a nut 22 against the clamping element 17. The nut 22 is threaded on a suitable bolt which can be threaded in the housing plate, or can be threaded directly on a through-bolt 19 which at the same time clamps the housing plates 1, 2 together, with the membrane filter element 3 located therebetween. Four such bolts 19 can be used, passed through holes 21 formed in the respective plates 1, 2, as seen in FIGS. 1 and 2. Only one such bolt is shown in FIG. 4, for ease of representation.

The clamping element 17, as best seen in FIG. 4, is clamped by a nut 22 on the bolt, the nut 22 bearing against the clamping element 17 which, in turn, bears against a nut 20, threaded on the bolt 19, to hold the plates 1, 2 in position. The nut 22 is slightly inclined with respect to the clamping element 17, when the clamping element 17 is in clamping position to provide for tight clamping pressure. The clamping element 17 could, alternatively, also be connected to an intermediate support which is screwed on the bolt 19 instead of the nut 22, and secured thereto. Of course, alternative arrangements to secure the clamping elements are easily possible, for example by forming blind bores in the outer surface of the plate 2, threading the blind bores, and then placing suitable screws or bolts into the blind bores, possibly with a spacer washer interposed, in order to clamp the clamping element towards the surface of the housing plate 2.

Various changes and modifications may be made within the scope of the inventive concept.

We claim:

1. Sealed membrane filter system having
   two housing plates (1, 2) positioned parallel to each other;
   a membrane filter means (3, 4) located between said plates;
   sealing means (5) sealing the circumference of the membrane filter means against said filter plate;
   connection means (6, 9) for providing an alternative to welding extending through at least one of the filter plates for connecting filtrate substances with the membrane filter means and, respectively, connecting substances to be filtered with the membrane filter means,
   wherein at least one of said connection means (6-9) comprises, in accordance with the invention,
   a through-bore (10) formed in said at least one plate (2);
   a recess (12) formed in the surface remote from the membrane filter means (3, 4) and surrounding said bore in said at least one plate, said recess defining a bottom wall surface (13) through which said bore (10) passes, said bottom wall surface forming at least part of a sealing surface (13);
   a connection plug (16) having a plug end surface fitting against said sealing surface (13); and
   clamping means (17) in clamping engagement with said connection plug (16) for sealingly clamping said plug end surface against said plate sealing surface (13).

2. The system of claim 1, wherein said through-bore (1) is of circular cross section; and wherein said recess (12) is of circular cross section, coaxial with said through-bore.

3. The system of claim 1, further including a ring groove (12) formed in the bottom wall surface (13) of the recess (12); and a sealing element (15) located in said ring groove.

4. The system of claim 3, wherein said sealing element comprises an O ring (15).

5. The system of claim 1, wherein said clamping element comprises an essentially U or horseshoe-shaped structure formed with projecting legs and a connecting portion, connecting said projecting legs, said projecting legs fitting over said connection plug (16), and bolt means passing through said connecting portions, said bolt means being screwed to said at least one plate (2).

6. The system of claim 1, wherein said recess (12) is bored or milled in the at least one housing plate (2).

7. The system of claim 1, further including threaded bolt means (19) connecting said plates (1, 2) to each other, with said membrane filter means interposed;

and wherein said clamping means includes a clamping element formed with an opening receiving a respective one of said bolts.

8. The system of claim 7, wherein said clamping means comprises a two-part structure (17; 20, 22).

9. The system of claim 1, wherein said connection plug is formed with a conical engagement surface at an end region thereof remote from said plug end surface for engagement by said clamping means.

10. The system of claim 9, wherein said clamping means comprises a generally U or horseshoe-shaped clamp engaging said conical surface.

* * * * *